United States Patent
Hashimoto et al.

(10) Patent No.: US 6,635,376 B2
(45) Date of Patent: Oct. 21, 2003

(54) SOLID OXIDE FUEL CELL HAVING COMPOSITION GRADIENT BETWEEN ELECTRODE AND ELECTROLYTE

(75) Inventors: Ikiko Hashimoto, Saitama (JP); Norikazu Komada, Saitama (JP); Kazunori Adachi, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/897,923

(22) Filed: Jul. 5, 2001

(65) Prior Publication Data

US 2001/0041278 A1 Nov. 15, 2001

Related U.S. Application Data

(62) Division of application No. 09/418,001, filed on Oct. 14, 1999, now Pat. No. 6,287,716.

(30) Foreign Application Priority Data

Oct. 14, 1998 (JP) ............................. 10-292398
Sep. 10, 1999 (JP) ............................. 11-257611

(51) Int. Cl.$^7$ ............................................... H01M 8/10
(52) U.S. Cl. ............................................... 429/33; 429/44
(58) Field of Search ............................... 429/33, 41, 44

(56) References Cited

U.S. PATENT DOCUMENTS 6,004,688 A * 12/1999 Goodenough et al. ........ 429/33
6,090,500 A * 7/2000 Ishihara et al. ............... 429/33

* cited by examiner

*Primary Examiner*—Laura Weiner
(74) *Attorney, Agent, or Firm*—Oblon, Spivak, McClelland, Maier & Neustadt, P.C.

(57) ABSTRACT

A solid oxide fuel cell and method of making same is disclosed. An electrolyte layer of an oxide ion conductor material that may be specified by $La_{1-a}A_aGa_{1-(b+c)}B_bCo_cO_3$ and an air electrode layer of an electron conductor material that may be specified by $La_{1-d}A_dCoO_3$ are laminated, preferably with an intermediate layer of an electron and ion mixed conductor material that may be specified by $La_{1-e}A_eGa_{1-(f+g)}B_fCo_gO_3$ interposed therebetween. The laminate may be sintered to integrate the layers, and may then subjected to a heat treatment to cause elements to diffuse through an interface between adjoining layers. The composition in each interface is thus continuously changed. Here, A may be at least one element selected from the group consisting of Sr and Ca, B may be at least one element selected from the group consisting of Mg, Al, and In, and $0.05 \leq a \leq 0.3$, $0 \leq b$, $e \leq 0.3$, $0 \leq c \leq 0.15$, $b+c \leq 0.3$, $0 \leq d \leq 0.5$, $0 \leq f \leq 0.15$, $0.15 < g \leq 0.3$, and $f+g \leq 0.3$. The cell is free from cracks, distortion, delamination, and the increase in interface resistance under thermal stress during sintering is reduced. In addition, an increase in the reaction area in an air electrode results in an improved cell efficiency.

22 Claims, 6 Drawing Sheets

FIG. 3A (PRIOR TO DIFFUSION) FIG. 3B (SUBSEQUENT TO DIFFUSION)

FIG. 4A (PRIOR TO DIFFUSION)

FIG. 4B (SUBSEQUENT DIFFUSION)

FIG. 5A (PRIOR TO DIFFUSION) FIG. 5B (SUBSEQUENT TO DIFFUSION)

FIG. 6A (PRIOR TO DIFFUSION)

FIG. 6B (SUBSEQUENT TO DIFFUSION)

SOLID OXIDE FUEL CELL HAVING COMPOSITION GRADIENT BETWEEN ELECTRODE AND ELECTROLYTE

BACKGROUND OF THE INVENTION

1. Field of the Invention

The present invention relates to a solid oxide fuel cell (SOFC, also called a solid oxide electrolyte cell). More particularly, the present invention relates to an air electrode of the cell and the structure of the air electrode, and a manufacturing method of the cell.

2. Discussion of the Background

The development of solid oxide fuel cells having a laminate structure, in which a solid electrolyte layer of oxide ion conductor material is interposed between an air electrode layer and a fuel electrode layer, represents a significant advance as a so-called third-generation power generating fuel cell.

In the solid oxide fuel cell, the air electrode is supplied with oxygen (for example air) and the fuel electrode is supplied with a fuel gas ($H_2$, CO, or other gas). The air electrode and the fuel electrode are porous so that the gas reaches the interface with the solid electrolyte. Oxygen supplied to the air electrode moves close to the interface with the solid electrolyte through the pores in the air electrode, and receives there electrons from the air electrode, and is then ionized to oxide ions ($O^{2-}$). Since the ionization of the oxygen molecule into the oxide ion in the air electrode involves oxygen molecules, electrons and oxide ions, the ionization takes place in only the three-phase interface of (1) a solid electrolyte layer transferring oxide ions, (2) air electrode particles transferring electrons, and (3) air for feeding oxygen molecules. The oxide ions move toward the fuel electrode in the solid electrolyte layer. The oxide ions diffuse through the solid electrolyte toward the fuel electrode. The oxide ions, close to the interface with the fuel electrode, react with a fuel gas, creating reaction products ($H_2O$, $CO_2$, etc.), and discharging electrons to the fuel electrode. For the same reason, the above electrode reaction takes place in the fuel electrode in the three-phase interface only, where the solid electrolyte layer, the fuel electrode particles, and a gaseous phase fuel gas meet. Expanding the three-phase interface is believed to be useful to smoothly carry out the electrode reaction.

When hydrogen is employed as a fuel, the electrode reaction is as follows.

Air electrode: $\frac{1}{2}O_2 + 2e^- \rightarrow O^{2-}$

Fuel electrode: $H_2 + O^{2-} \rightarrow H_2O + 2e^-$

Overall cell: $H_2 + \frac{1}{2}O_2 \rightarrow H_2O$ (When CO is used, $CO + \frac{1}{2}O_2 \rightarrow CO_2$)

Since the solid electrolyte layer functions both as a transfer medium for oxide ions and a membrane for preventing the fuel gas from being in direct contact with air at the same time, the solid electrolyte is required to have a compact construction so as to be impermeable to the penetration of gas.

The solid electrolyte must be constructed of a material which shows a high ion conductivity, and is chemically stable under varying conditions from an oxidation environment in the air electrode to a reduction environment in the fuel electrode, and insusceptible to thermal shocks. As a material meeting these criteria, stabilized zirconia with yttria added (YSZ) is typically used for a solid electrolyte material. Stabilized zirconia has a crystal structure of face centered cubic lattice of the fluorite type. The conventional solid oxide fuel cells are operated at or in the vicinity of a temperature of 1000° C., where stabilized zirconia, used as an electrolyte, exhibits a high oxide ion conductivity.

The air electrode (i.e., a cathode) and the fuel electrode (i.e., an anode) need to be constructed of a material having a high electron conductivity. Metals are not appropriate, since the air electrode material is required to be chemically stable in a high-temperature, oxidation environment at or in the vicinity of 1000° C. Typically employed for the air electrode are perovskite type oxide materials having electron conductivity, for example, $LaMnO_3$ or $LaCoO_3$, or a solid solution of these with part of La replaced with Sr, Ca or the like. Although $LaCoO_3$ outperforms $LaMnO_3$ in terms of both polarization characteristics and electron conductivity, $LaMnO_3$ is more widely used because $LaMnO_3$ is Similar to stabilized zirconia in thermal expansion coefficient. The material of the fuel electrode is typically a metal such as Ni or Co, or a cermet such as Ni—YSZ or Co—YSZ.

Figure 1A:
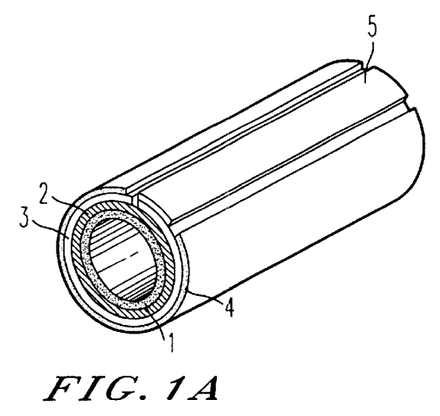
FIG. 1A is a perspective view showing a cylindrical unit cell of solid oxide fuel cell type, and FIG. 1B(1)–1B(3) are perspective views showing a flat unit cell of solid oxide fuel cell type.
Figure 1B:
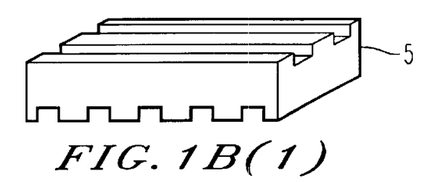

The solid oxide fuel cells are available in two types, namely, a cylindrical type as shown in FIG. 1A and a flat type as shown in FIGS. 1B(1)–1B(3).

The cylindrical unit cell shown in FIG. 1A is constructed by coaxially and compactly wrapping, around an insulating porous ceramic cylindrical body 1, an air electrode layer 2, a solid electrolyte layer 3, and a fuel electrode layer 4 in that order from the inside. A conductive interconnector 5, serving as a terminal for the air electrode 2, is in contact with the air electrode 2 but out of contact with the fuel electrode 4, and penetrates the electrolyte layer 3. Each layer is formed through a flame spraying process, an electrochemical deposition process, a slip casting process, or other process.

The single flat cell shown in FIGS. 1B(1)–1B(3) includes an air electrode layer 2 on one side of a solid electrolyte layer 3 and a fuel layer 4 on the other side of the solid electrolyte layer 3. Unit cells are mutually interconnected using fine-structured interconnectors 5, each having a gas passageway. The flat unit cell is produced as follows: a solid electrolyte layer is formed by sintering a green sheet that is produced by a doctor blade process or an extrusion process; a slurry of air electrode material is applied on one side of the solid electrolyte layer; a slurry of fuel electrode layer is applied on the other side of the solid electrolyte layer; and the laminated electrolyte layer is sintered. The sintering process may be performed each time the slurry is applied to each side of the electrolyte layer, rather than after all the slurry applications are performed on both sides of the electrolyte layer. Alternatively, the green sheets of the electrolyte layer and the electrode layers are produced and laminated, and are then subjected to an all-at-once sintering process. Such a wet process is less costly. In the same way as in the cylindrical type, the flame spraying process or the electrochemical deposition process may also be utilized.

In the solid oxide fuel cell thus constructed, the electrolyte layer is different from electrode layers in terms of elements and crystal structure. The distribution of an element is discontinuous, in other words, stepwise changes in the interface between the electrode layer and the electrolyte layer. Because of a difference in thermal expansion coefficient between materials, a unit cell is subject to a distortion, cracks, or delamination under thermal stress during the manufacturing stage such as in the sintering process or during the operation of the fuel cell. The elements diffuse between the materials or react during the sintering process or the operation, causing a high-resistance compound to develop in the interface, and thereby increasing interface resistance and degrading the bonding of the interface.

To resolve this problem, an air electrode is conventionally formed by mixing a perovskite type oxide, as an air electrode material, with an electrolyte material YSZ (see Japanese Unexamined Patent Publication 4-101359 and Japanese Unexamined Patent Publication 5-151981). This arrangement alleviates a sharp change in the thermal expansion coefficient in the vicinity of the interface between the electrolyte layer and the air electrode layer, resulting an improved bond. For the fuel electrode, the cermet of a metal and an electrolyte, such as Ni—YSZ, is employed for the same reason.

As disclosed in Japanese Unexamined Patent Publication No. 5-151981, a perovskite type oxide coexists with YSZ in the air electrode which is a mixture of the perovskite type oxide and YSZ, and a three-phase interface, needed to ionize oxygen molecules, is expanded. In other words, YSZ, mixed into the air electrode, works as aggregates to expand the three-phase interface. In this sense, the mixing of the electrolyte material into the air electrode is effective. However, the interface between the electrolyte layer and the air electrode layer is still discontinuous in composition and construction, and the rates of change in the thermal expansion coefficient and composition are merely slightly reduced. This arrangement is not considered as a solution to fully resolving the above problem, and the effectiveness of the arrangement is not sufficient.

Several techniques have been proposed to reduce a difference in thermal expansion coefficient or composition between a solid electrolyte layer and an electrode layer (an air electrode layer, for example). For example, Japanese Unexamined Patent Publication No. 7-296838 discloses a layer, interposed between the a solid electrolyte layer and an electrode layer, and having a thermal expansion coefficient intermediate between those of the two layers. Japanese Unexamined Patent Publication No. 4-280075 discloses a layer constructed of mixed materials of the two layer. Japanese Unexamined Patent Publication No. 278663 and Japanese Unexamined Patent Publication No. 266000 respectively disclose a gradient composition layer in which a composition continuously changes between the two layers. Japanese Unexamined Patent Publication No. 5-29004 has proposed making a solid solution of Mn or Co in a YSZ electrolyte, a portion of which is in contact with an air electrode composed of a perovskite type oxide containing Mn or Co. In all of these disclosures, YSZ is employed for the electrolyte material.

Any of the above-noted disclosures has some limited advantage. There are still substantial differences, however, in crystal structure and composition between fluorite type YSZ, which is the electrolyte material, and the perovskite type oxide, which is the air electrode material. For this reason, when the intermediate layer or the mixed layer is interposed between the two layers, a composition discontinuity, wherein a stepwise change in composition occurs, thereby reducing the effectiveness of the techniques to marginal improvements. The gradient composition layer cannot fully control the formation of the composition discontinuity. Each of the above disclosures employs the flame spraying process, supplying two types of powder, one for an electrolyte layer and the other for an air electrode layer, in a manner such that the ratio of mixture is gradually changed to form a composition gradient. If viewed from a micron-order scale, two types of particles having different compositions and different crystal structures are merely mixed. Accordingly, the control of the composition is difficult, and the products are thus subject to a reliability problem.

SUMMARY OF THE INVENTION

Accordingly, it is an object of the present invention to provide a solid oxide fuel cell, particularly the electrode structure of its air electrode, which essentially eliminates the above problem. It is also an object of the present invention to provide a manufacturing method for manufacturing the solid oxide fuel cell.

These and other objects are achieved by employing an electrolyte material and an air electrode material having an identical crystal structure and a similar composition, assuring a continuous composition change in the interface between both materials, and by arranging an intermediate composition of the two materials as a conductor mixture.

According to one aspect of the present invention, a solid oxide fuel cell having a laminate structure is provided that includes an air electrode layer, a fuel electrode layer, and a solid electrolyte layer interposed between the air electrode layer and the fuel electrode layer, wherein each of the electrolyte layer and the air electrode layer includes a perovskite type material and a composition continuously changes between the electrolyte layer and the air electrode layer.

According to another aspect of the present invention, a solid oxide fuel cell having a laminate structure is provided that includes an air electrode layer, a fuel electrode layer, a solid electrolyte layer interposed between the air electrode layer and the fuel electrode layer, and an intermediate layer interposed between the electrolyte layer and the air electrode layer, wherein the electrolyte layer includes a perovskite type oxide ion conductor material, the air electrode layer includes a perovskite type electron conductor material, the intermediate layer includes a perovskite type electron and ion mixed conductor material, and a composition continuously changes in each of an interface between the intermediate layer and the electrolyte layer and an interface between the intermediate layer and the air electrode layer.

According to yet another aspect of the present invention, a method of manufacturing a solid oxide fuel cell is provided that includes the steps of laminating, into a laminate, an air electrode layer of a perovskite type electron conductor material and an electrolyte layer of a perovskite type oxide ion conductor material, sintering the laminate to integrate the air electrode layer and the electrolyte layer, and heat treating the laminate for diffusing an element of the air electrode layer into the electrolyte layer in the interface between the air electrode layer and the electrolyte-layer or for diffusing an element of the electrolyte layer into the air electrode layer in the interface therebetween, or for diffusing the element of the air electrode layer into the electrolyte layer and the element of the electrolyte layer into the air electrode layer in the interface therebetween.

According to yet another aspect of the present invention, a method of manufacturing a solid oxide fuel cell is provided that includes the steps of laminating, into a laminate, an air electrode layer of a perovskite type electron conductor material, at least one intermediate layer of a perovskite type electron and ion mixed conductor material, and an electrolyte layer of a perovskite type oxide ion conductor material with the intermediate layer interposed between the air electrode layer and the electrolyte layer, sintering the laminate to integrate the air electrode layer, the intermediate layer, and the electrolyte layer, and heat treating the laminate for diffusing an element constituting the air electrode into the intermediate layer in the interface between the air electrode layer and the intermediate layer, or for diffusing an element of the intermediate layer into the air electrode layer in the interface therebetween, or for diffusing the element of the air electrode layer into the intermediate layer and the element of the intermediate layer into the air electrode layer in the interface therebetween, and for diffusing an element of the intermediate layer into the electrolyte layer in the interface between the intermediate layer and the electrolyte layer, or for diffusing an element of the electrolyte layer into the intermediate layer in the interface therebetween, or for diffusing the element of the intermediate layer into the electrolyte layer and the element of the electrolyte layer into the intermediate layer in the interface therebetween.

BRIEF DESCRIPTION OF THE PREFERRED EMBODIMENTS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

Since YSZ has been the only working material conventionally available as an electrolyte material for solid oxide fuel cells, all conventional electrolyte materials have been developed based on YSZ only.

The inventors of the present invention have found, surprisingly, from among perovskite type materials, a material exhibiting a high oxide ion conductivity superior to that of YSZ. That material is lanthanum gallate oxide expressed by the following formula:

wherein A is at least one element selected from the group consisting of Sr and Ca, B is at least one element selected from the group consisting of Mg, Al, and In, wherein $0.05 \leq a \leq 0.3$, $0 \leq b \leq 0.3$, $0 \leq c \leq 0.15$, and $b+c \leq 0.3$.

This material generally exhibits an electrical conductivity higher than that of YSZ at any temperature, and its ion transport number (the fraction of the total electrical conduction carried out by ion conduction) varies with the c value. When the c value is equal to or smaller than 0.15, this material satisfactorily works as an oxide ion conductor having an ion transport number within a range of 0.7 to 1.0. The use of the lanthanum gallate oxide material as the electrolyte permits the manufacture of a solid oxide fuel cell that can operate in a wide temperature range from a high temperature of 1000° C., at which YSZ is operated, down to a low temperature of 600° C., like YSZ.

The lanthanum gallate oxide material having the c value greater than 0.15 has a perovskite type crystal structure and has a high electrical conductivity. But its ion transport number becomes low to within a range of 0.1 to 0.7. The lanthanum gallate oxide material thus becomes an electron and ion mixed conductor, e.g. mixed electron and ion conductor, in which the ion conductivity by the oxide ions substantially balances the electron conductivity. The electron and ion mixed conductor is appropriate as the air electrode aggregates already discussed, and is interposed between the electrolyte layer and the air electrode particles. The reason for this is believed to be as follows.

Figure 2A:
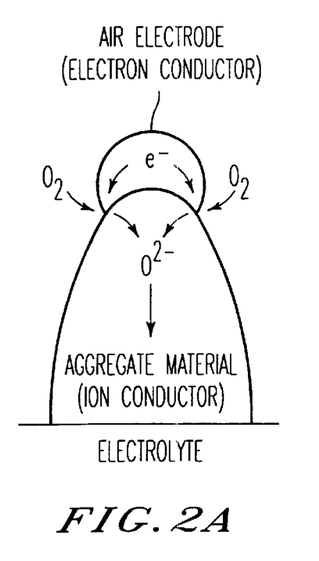
FIG. 2A is an explanatory view showing the ionization of oxygen in a conventional three-phase interface.

In the conventional structure in which an electrolyte layer of an oxide ion conductor is in contact with an air electrode layer of an electron conductor, the ionization of oxygen into oxide ions is carried out in only the three-phase interface of the electrolyte layer, the air electrode and air. The three-phase interface is a one-dimensional region running along a circumference (a circle) of the junction area of the electrolyte layer and the air electrode layer as shown in FIG. 2A. If the area, in which oxygen can be ionized, is so narrow as this, the polarization of the air electrode increases, thereby lowering the output of the fuel cell. Since the electrolyte layer also needs to be in contact with air, fully covering the electrolyte layer with the air electrode is not permitted, and the amount of adhered air electrode material is limited.

Figure 2B:
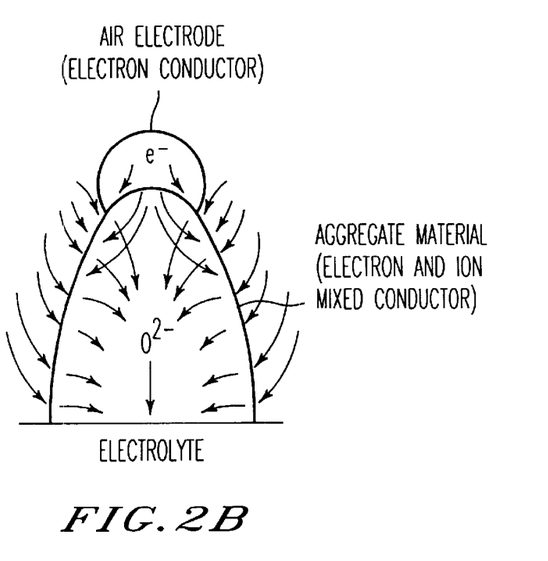
FIG. 2B is an explanatory view showing the ionization of oxygen in a two-phase interface when an electron and ion mixed conductor is used for an air aggregate material.

If an aggregate of electron and ion mixed conductor is interposed between the air electrode and the electrolyte, the aggregate exhibits two characteristics of oxide ion conductivity, required to ionize oxygen, and electron conductivity. With this aggregate only, oxygen molecules in the air are ionized to be oxide ions. In this case, the ionization of oxygen takes place in a two-phase interface of the aggregate and air, namely, in a two-dimensional area of the external surface of the aggregate as shown in FIG. 2B. In other words, this arrangement dramatically expands the (reaction) area in which oxygen is ionized, making the polarization occur less, and increasing cell efficiency. With the aggregate only, however, conduction of electrons to an external terminal is insufficient. An air electrode material of an electron conductor is needed from the standpoint of the catalytic activity to the electrode reaction.

The inventors have found that the same perovskite type crystal structure is commonly shared by the solid electrolyte material of the above lanthanum gallate (i.e., an oxide ion conductor), the material of the air electrode aggregate (i.e., an electron and ion mixed conductor), and a conventional air electrode material (i.e., an electron conductor) expressed by a chemical formula $La_{1-d}Sr_dCoO_3(0 \leq d \leq 0.5)$, and that there is a similarity in elements (with common metal elements shared) between these materials, and have studied solid oxide fuel cells employing these materials.

According to the above-noted studies, when three layers of a solid electrolyte material, an aggregate material, and an air electrode material are laminated and sintered, and are further subjected to a high-temperature treatment, the smooth diffusion of elements results between layers because the crystal structures are all perovskite type. The inventors have thus found that a concentration gradient in which the composition of an element continuously changes between layers is created. When a sintered body of two layers including a layer of electrolyte and a layer of air electrode, with no aggregate layer employed, is heat treated, a concentration gradient also takes place between the two layers resulting from the diffusion of the element, and a region of a composition, corresponding to the aggregate of which chemical formula is shown in formula (3), is thus produced.

When the concentration gradient (in which the composition gradually changes between the two layers) is formed by heat treating the electrolytic layer and the air electrode layer having the identical crystal structure, discontinuity (in which the composition exhibits stepwise changes between the two layers) does not occur. The diffusion of the element increases both the adhesion and the bond strength of the two layers. Even if a fuel cell is subjected to thermal shocks such as temperature cycles of high temperature and low temperature during use, the fuel cell is less susceptible to cracks, deformation, and delamination, and suffers less from an output drop. Since the crystal structures of the materials are identical and metal elements are commonly shared between the two layers, the difference in thermal expansion coefficient between materials is marginal, and the occurrence of cracks and deformation during the sintering process is reduced. Furthermore, there is little possibility that a substance increasing an interface resistance develops in the interface.

Preferably, the solid oxide fuel cell of the present invention is characterized by an air electrode of electron conductor, a solid electrolyte of oxide ion conductor, and an interlayer structure between these two layers. More preferably, both an air electrode layer and a solid electrolyte layer are constructed of materials having an identical crystal structure, and the compositions of the elements continuously change between the two layers.

Preferably, an intermediate layer of electron and ion mixed conductor having a perovskite type crystal structure is interposed between the two perovskite type materials, and the compositions continuously change in an interface between the intermediate layer and the air electrode layer and in an interface between the intermediate layer and the electrolyte layer.

The sentence "the compositions continuously change" in the context of the present invention means that there is no stepwise discontinuity in the variation of the composition.

Preferably, the construction of the present invention may be implemented in both a cylindrical cell and a flat cell. The flat cell may be a stack type or unitary sintered type (monolith type). As long as the above referenced characteristic construction and material requirements are satisfied, the present invention sets no other particular requirements in construction and material.

The present invention is not limited to particular materials, as long as the materials of the electrolyte layer, the air electrode layer, and the intermediate layer have an identical perovskite type crystal structure, with the electrolyte layer being an oxide ion conductor, the air electrode layer being an electron conductor, and the intermediate layer being an electron and ion mixed conductor. Preferably, the materials in use are stable at a high temperature, namely, an operating temperature of the cell, and in operating environments (both a reduction environment and an oxidation environment in the electrolyte layer and an oxidation environment in the air electrode layer).

Preferably, the oxide ion conductor (oxides) has an ion transport number of 0.7 or greater, the electron and ion mixed conductor has an ion transport number within a range of 0.1 to 0.7, and the electron conductor has an ion transport number of 0.1 or smaller.

In a preferred embodiment of the present invention, the materials of the electrolyte layer and the air electrode layer share a common metal element, and the materials of the electrolyte layer, the intermediate layer, and the air electrode layer share a common element. Specifically, at least one element is commonly used. Preferably, two elements are commonly used, and more preferably, three elements are commonly used. With this arrangement, a heat treatment creates a gradient region in which the composition of each element continuously changes, and the generation of a compound giving rise to a high interface resistance is avoided.

Preferably, the materials that satisfy the above requirements are the ones expressed by the following general formulas:

Electrolyte layer: $La_{1-a}A_aGa_{1-(b+c)}B_bCo_cO_3$     (1)

Air electrode layer: $La_{1-d}A_dCoO_3$     (2)

Intermediate layer: $La_{1-e}A_eGa_{1-(f+g)}B_fCo_gO_3$     (3)

Here, A is one element or two elements selected from among Sr and Ca, B is one element or two or more elements selected from among Mg, Al, and In, and $0.05 \leq a \leq 0.3$, $0 \leq b$, $e \leq 0.3$, $0 \leq c \leq 0.15$, $b+c \leq 0.3$, $0 \leq d \leq 0.5$, $0 \leq f \leq 0.15$, $0.15 \leq g \leq 0.3$, and $f+g \leq 0.3$.

The three materials commonly share two elements of La and Co. If A is the same element in the above chemical formulas, this is also a common element, and consequently, the three elements are commonly shared by the three layers.

In each of the above general formulas (1) through (3), element A is preferably Sr, and element B is preferably Mg. There is no need to make element A and element B respectively consistent throughout all layers. In each of the above chemical formulas, the atomic ratio of oxygen is three, but as is obvious to those skilled in the art, oxygen deficiency takes place when a is not zero, and the atomic ratio of oxygen is often smaller than three, in practice. Since the number of oxygen deficiencies varies depending on the type of additive elements A and B and manufacturing conditions, the atomic ratio of oxygen of three is assumed for convenience.

The compositions in the electrolyte layer according to formula (1) are preferably $0.1 \leq a \leq 0.25$, more preferably $0.17 \leq a \leq 0.22$, preferably $0 \leq b \leq 0.17$, more preferably $0.09 \leq b \leq 0.13$, preferably $0.02 \leq c \leq 0.15$, more preferably $0.02 \leq c \leq 0.10$, and preferably $0.1 \leq b+c \leq 0.25$, more preferably $0.15 \leq b+c \leq 0.22$. The preferred composition in the air electrode layer according to formula (2) is $0.1 \leq d \leq 0.4$. The preferred compositions in the intermediate layer according to formula (3) are $0.1 \leq e \leq 0.3$, $0.17 \leq g \leq 0.3$, and $0 \leq f \leq 0.13$, more preferably f=0.

Each of the materials expressed by the above general formulas (1) through (3) is an electrically conductive material having a perovskite type crystal structure, and exhibits a conductivity higher than that of YSZ. These materials are different from each other in ion transport number at respective conductivity.

The material represented by formula (1) is an oxide ion conductor, featuring a high ion transport number (in other words, the ion conduction is predominant). This material is chemically stable, suffering from no large variation in conductivity from the high-temperature oxidation environment to the reduction environment. This material fits the electrolyte layer of a solid oxide fuel cell. Having a conductivity higher than that of YSZ at any temperature, this material exhibits an oxide ion conductivity sufficient for the electrolyte layer of the fuel cell even in a relatively low temperature range of 600–800° C. within which YSZ fails to operate because of its low conductivity. This material remains stable and usable even in a high temperature range in excess of 1000° C.

Figure 7:
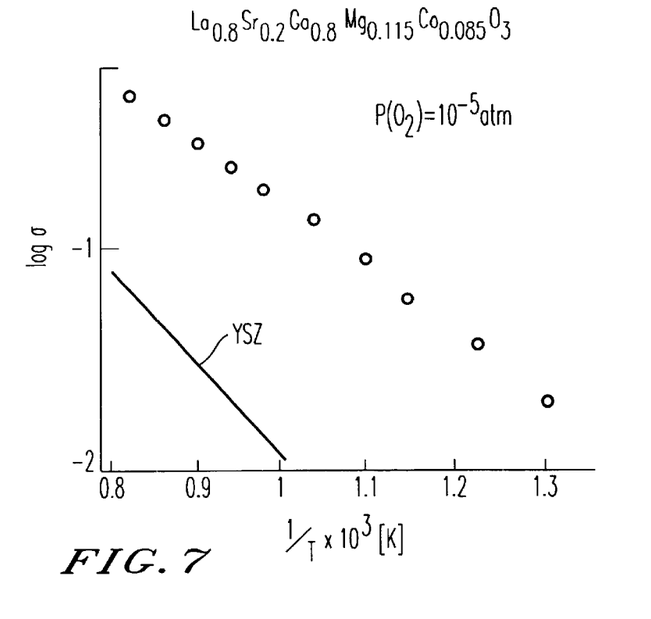
FIG. 7 shows an Arrhenius plot of a perovskite type oxide ion conductor used in the present invention.

FIG. 7 shows an Arrhenius plot of the logarithm (log σ) of conductivity σ of a sintered material having the compositions of a=0.2, b=0.115, and c=0.085 in formula (1), namely $La_{0.8}Sr_{0.2}Ga_{0.8}Mg_{0.115}Co_{0.085}O_3$ (referred to as formula (a)), at an oxygen partial pressure $P(O_2)$ of $10^{-5}$ atm. FIG. 7 also shows an Arrhenius plot of YSZ represented in a solid line for reference. As can be seen from FIG. 7, the perovskite material expressed by formula (a) exhibits a conductivity substantially larger (e.g., by one order of magnitude) than that of YSZ at all temperatures. The conductivities of both materials get smaller as the temperature becomes lower (with 1/T increasing on the abscissa). For example, the conductivity YSZ exhibits at a temperature of about 1000° C. (at 0.78 on the abscissa) is achieved by the material of the composition indicated by formula (a) at a temperature of about 650° C. (at 1.08 on the abscissa).

Figure 8:
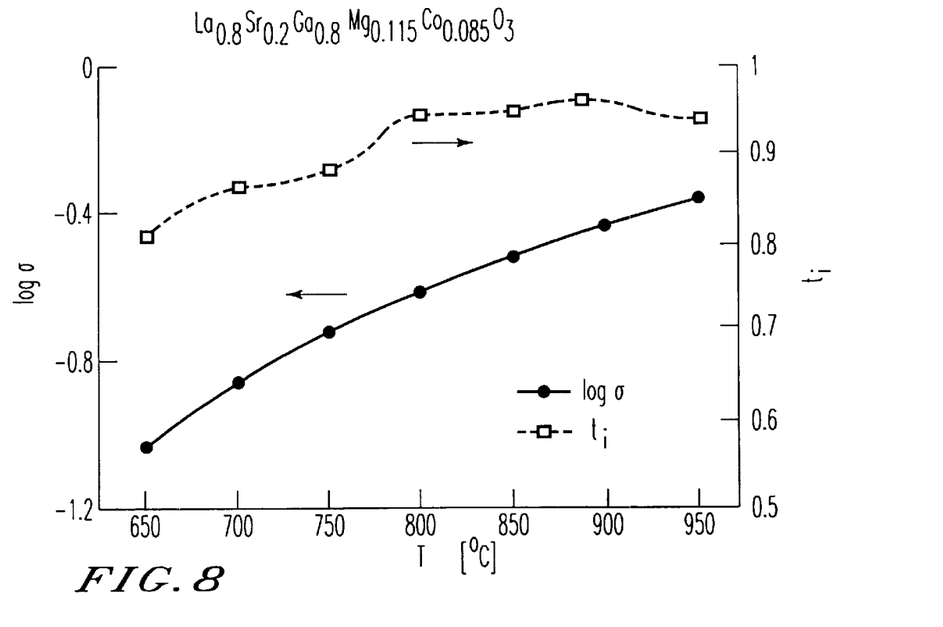
FIG. 8 is a graph showing the changes of the conductivity and the ion transport number of a perovskite type oxide ion conductor used in the present invention, with respect to temperature.

FIG. 8 shows the conductivity (log σ) and the ion transport number ($t_i$) of the sintered material having the composition expressed in formula (a) within a temperature T range of 650 to 950° C. The oxygen partial pressure remains unchanged from the one discussed above. As can be seen from FIG. 8, the sintered material provides an ion transport number of 0.8 or greater above a temperature of 650° C., thereby offering a predominant oxide ion conductivity with a smaller electron conductivity, and thus proves useful as an oxide ion conductor.

The measurement of conductivity is performed as follows. A platinum wire is connected to a test specimen of a sintered material using a platinum paste, and the conductivity of the test specimen is measured using a DC four-terminal method or an AC two-terminal method in an apparatus which can adjust the oxygen partial pressure and temperature. To determine the ion transport number, an oxygen concentration cell is produced using a test specimen of a sintered material, and the electromotive force of the cell is measured. The ion transport number is derived from the ratio of the measured electromotive force to the theoretical electromotive force determined from the Nernst equation.

Since the conductivity of the test specimen is greater than that of YSZ by about one order of magnitude at the same temperature, the oxide ion conductivity of the material is substantially greater than that of YSZ even in its smaller value region. If a solid oxide fuel cell is produced using the material specified by formula (a) as the electrolyte, setting the operating temperature to be as high as 1000° C. or so as in the case of YSZ is not required. For example, the fuel cell may operate at an operating temperature in a low temperature range of 650 to 700° C. In such a low operating temperature, steel materials such as stainless steel are usable as structural materials, and compared to ceramics such as Ni—Cr used at a high operating temperature as high as about 1000° C., material costs are dramatically reduced. Even if the operating temperature is lowered, the cell efficiency of the solid oxide fuel cell is not reduced so much by performing power generation utilizing steam or other waste gases, or employing them for high energy utilization.

Figure 9:
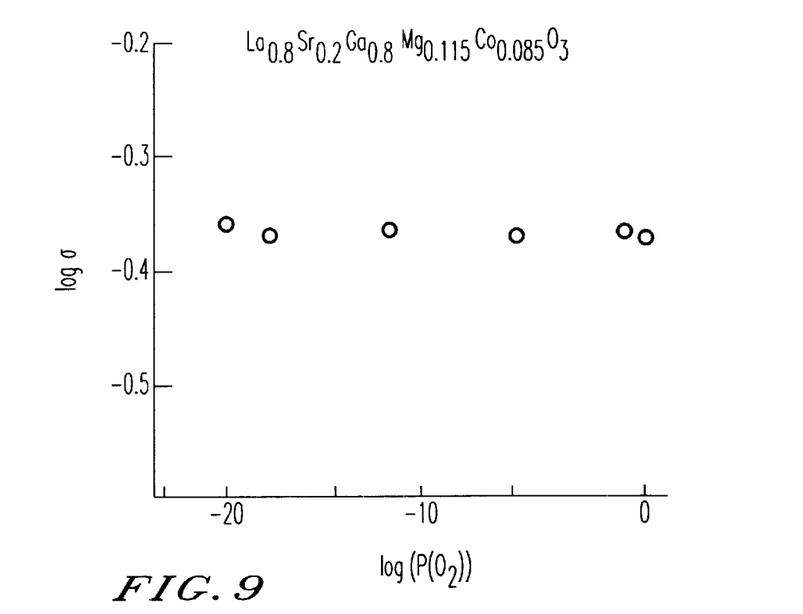
FIG. 9 is a graph showing the dependency of the conductivity of the perovskite type electron and ion mixed conductor used in the present invention, on oxygen partial pressure.

FIG. 9 is a graph showing the dependency of the conductivity (log σ) of the sintered material having the composition specified by formula (a), on oxygen partial pressure ($P(O_2)$). FIG. 9 shows that the sintered material provides a stable conductivity from an oxidation environment to a reduction environment.

The material represented by formula (3), having a Co concentration higher than that of the material represented by formula (1), becomes an electron and ion mixed conductor in which the ion conduction substantially balances the electron conduction. This material is also stable from a high-temperature oxidation environment to a reduction environment, and is appropriate to be used as an air electrode aggregate material exposed to an oxidation environment. If the air electrode aggregate is constructed of an electron and ion mixed conductor, the ionization of oxygen occurs not only in a three-phase interface of the electrolyte, gaseous phase (air), and the electrode, but also in a two-phase interface of the aggregate material and the gaseous phase. The area available for the ionization activity substantially increases, resulting an improved cell efficiency.

Figure 10:
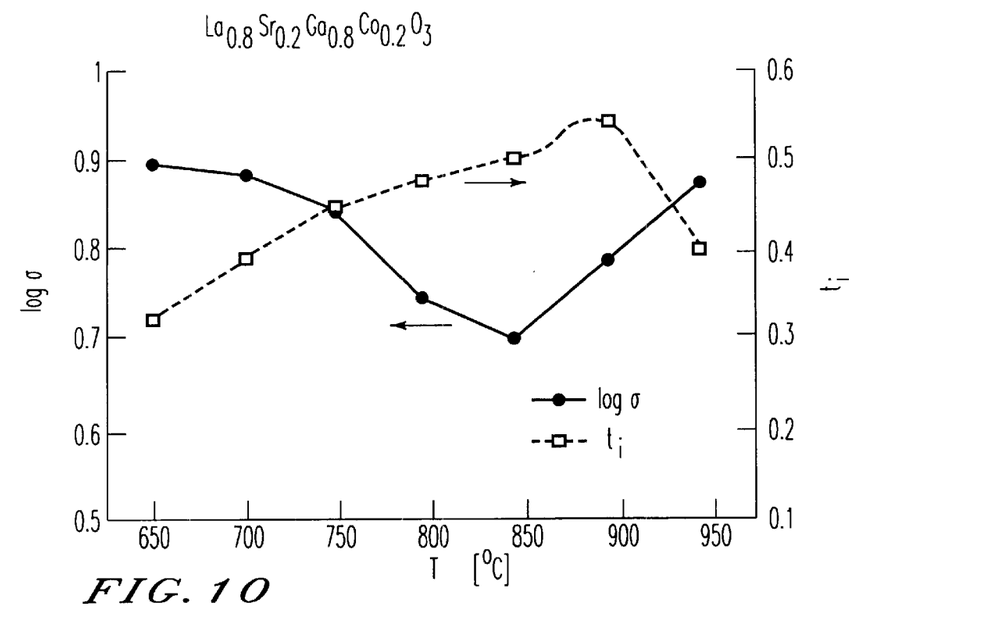
FIG. 10 is a graph showing the changes of the conductivity and the ion transport number of a perovskite type electron and ion mixed conductor used in the present invention, with respect to temperature.

FIG. 10 shows the logarithm (log σ) of conductivity σ and ion transport number ($t_i$) of a material having the compositions of e=0.2, f=0, g=0.2 in formula (3), namely $La_{0.8}Sr_{0.2}Ga_{0.8}Co_{0.2}O_3$ (referred to as formula (c)) within a temperature T range of 650 to 950° C. The oxygen partial pressure remains unchanged from the preceding material. As can be seen from FIG. 10, this material exhibits a conductivity higher than that of the material having the composition specified by formula (a). The material shows that the dependency of the conductivity on temperature is small, and provides an unpredicted result that the conductivity is substantially unchanged within a temperature range of 700° C. to 950° C. The ion transport number falls within a range of 0.3 to 0.6 over a measured temperature range of 700 to 950° C. This material is an electron and ion mixed conductor in which the electron conduction substantially balances the ion conduction, and is appropriate as an air electrode material.

The material represented by formula (2), having no Ga, is an electron conductor which provides electron conductivity only. This material has been conventionally used in the air electrode of the solid oxide fuel cell, and its advantages have been proven.

Figure 11:
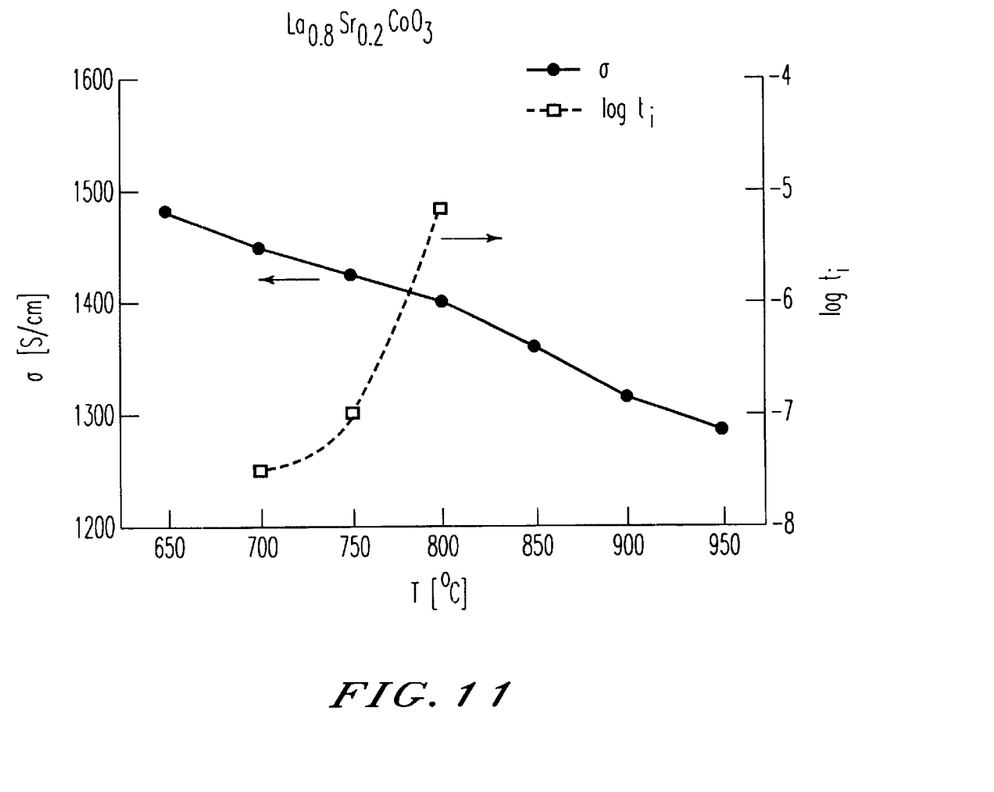
FIG. 11 is a graph showing the changes of the conductivity and the ion transport number of a perovskite type electron conductor used in the present invention, with respect to temperature.

FIG. 11 shows the conductivity σ and ion transport number (log $t_i$) of a material having the compositions of d=0.2 in formula (2), namely $La_{0.8}Sr_{0.2}CoO_3$ (referred to as formula (b)) within a temperature T range of 650 to 950° C. The oxygen partial pressure is 1 atm. This material shows a fairly large conductivity in the oxidation environment, and is appropriate as an air electrode material. The ion transport number of this material is 0.1 or smaller, and is an electron conductor substantially having no ion conductivity.

$LaCoO_3$ materials represented by formula (b) are conventionally known to have a conductivity higher than those of $LaMnO_3$ materials. Since $LaMnO_3$ materials have a thermal expansion coefficient near to that of a stabilized zirconia, $LaMnO_3$ materials have been recommended for the air electrode material regardless of their low conductivity (with a large resistance loss). In accordance with the present invention, $LaCoO_3$ materials having a low resistance loss are employed for the air electrode material without any problem.

Preferably, the materials having compositions specified by formulas (1) through (3) are prepared using methods typically used in the field of ceramics. Specifically, the powders of the oxides of member metal elements or their precursors (materials that change into oxides through thermal decomposition, for example, carbonate, or carboxylate) are mixed at a predetermined atomic ratio, molded as required, and sintered. The sintering conditions are set so that a sintered material having a perovskite type crystal structure is obtained. The sintered material may be atomized to form each layer.

The preferred manufacturing method of the present invention of manufacturing an air electrode is now discussed. The preferred production of a flat type cell is here discussed. Similarly, given the teachings herein, a cylindrical type cell may also be produced within the skill of those in the art.

Preferably, according to a first method of the present invention, an air electrode layer of a perovskite type material is laminated onto an electrolyte layer of a perovskite type material to form a laminate, the laminate is sintered to integrate the air electrode layer and the electrolyte layer, and the laminate is heat treated so that element diffusion takes place in the interface between the air electrode layer and the electrolyte layer. The lamination and sintering processes remain unchanged from conventional processes. Specifically, the two layers in their green sheets are laminated through thermocompression bonding, and are then sintered simultaneously. Alternatively, an air electrode layer may be laminated onto a sintered electrolyte layer through a slurry coating method or a screen printing process, and is then subjected to a sintering process. The simultaneous or "all-at-once" sintering is more advantageous from the standpoint of the number of steps involved.

A preferred molding method for producing a mold may be a doctor blade method, a compression molding method, a hydrostatic pressure press method, or a cast molding method. For example, one layer may be directly molded onto the other layer of green sheet using a slurry coating method or a doctor blade coating method. Alternatively, one layer may be directly molded onto the sintered material using a slurry coating method, a screen printing method, or flame spraying method.

Subsequent to the sintering, the thickness of the electrolyte layer is preferably within a range of 10 to 200 $\mu$m, and the air electrode layer is preferably within a range of 20 to 300 $\mu$m. Preferably, the electrolyte layer needs to be compact, while the air electrode layer needs to be porous. The porosity of each layer is preferably controlled by the powder particle size and the sintering conditions. The control of the porosity is well known to those skilled in the art.

To preclude an increase in the interface resistance, the electrolyte layer and the air electrode layer are preferably constructed of materials having an identical element in common. In this respect, the electrolyte layer is more preferably constructed of the material specified by formula (1), and the air electrode layer is more preferably constructed of the material specified by formula (2).

The sintered body, into which the electrolyte layer and the air electrode layer are integrated, is subjected to a heat treatment to diffuse elements in the interface between the two layers in accordance with the present invention. In this way, a gradient region is generated in the interface between the two layers, in which the composition of each element continuously changes. The heat treatment is advantageously performed in succession to the sintering, but may be separately performed later.

The present invention is not limited to particular heat treatment conditions, as long as the diffusion of the elements is accomplished. The temperature in the heat treatment may be lower or higher than or equal to the sintering temperature. When the electrolyte layer and the air electrode layer are constructed of the above more preferable materials, a preferred temperature for the heat treatment falls within a range of 1100 to 1500° C., more preferably 1150 to 1450° C., most preferably 1200 to 1400° C. The heat treatment time required to allow the elements to diffuse at this temperature may be within a range of 1 to 100 hours, more preferably 20–80 hours, most preferably 30–70 hours. Although air satisfactorily works as a heat treatment atmosphere, an inert gas atmosphere is also acceptable. Inert gas atmospheres are within the skill of the ordinary artisan. The sintering process and the heat treatment are similar in their conditions, and discriminating between the two processes, however, is not easy. In the present invention, the heating operation for integrating the two layers is referred to as the sintering process, and the heating operation for diffusing the elements in the interface is referred to as the heat treatment.

Figure 3A:
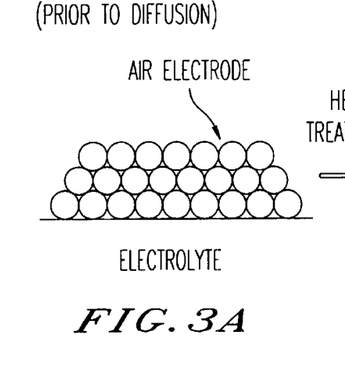
FIGS. 3A and 3B show interfaces between an electrolyte layer and an air electrode layer, prior to and subsequent to a diffusion of elements.
Figure 3B:
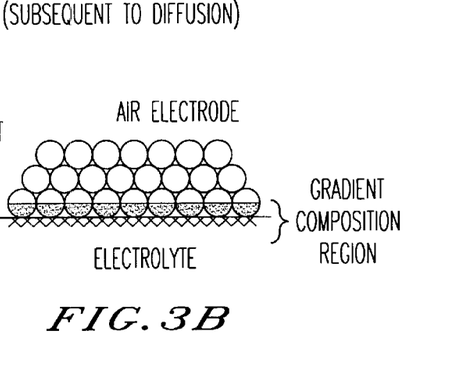

Through the heat treatment, the elements diffuse through the interface between the two layers. Since the electrolyte layer and the air electrode layer have an identical crystal structure called perovskite type crystal structure, the diffusion of the elements is smoothly in progress. Under the above-discussed realistic heat treatment conditions, the elements are diffused in the interface between the electrolyte layer and the air electrode layer. As shown in FIG. 3B and FIG. 4B, a (gradient) region having a gradient composition in which the composition (the concentration gradient of each element) continuously changes is generated in the interface between the electrolyte layer and the air electrode layer.

Gradient regions are also stated in Japanese Unexamined Patent Publication No. 2-278663 and Japanese Unexamined Patent Publication No. 9-266000, the entire contents of each of which are hereby incorporated by reference. The conventional gradient regions proposed in these disclosures are produced by supplying two types of powder, one for an electrolyte layer and the other for an air electrode layer, during a layer forming through a flame spraying process with the ratio of the two types continuously changed. However, the gradient composition created through this technique provides a mere mixture of two types of particles which are different in composition and crystal structure if microscopically viewed. Since the mixing ratio merely changes, the generation of a discontinuity is microscopically unavoidable. The disclosed technique cannot prevent an increase in the interface resistance.

In accordance with the present invention, the gradient region is formed through the element diffusion in the heat treatment, and no stepwise discontinuity occurs even microscopically. This is achieved because both the electrolyte layer and the air electrode layer employ oxides of perovskite type having an identical crystal structure. Since the gradient region is formed in the heat treatment, the layer forming method is not limited. The diffusion of the elements substantially improves the adhesion or bond strength, and effectively prevents cracks and delamination between the two layers.

Since the electrolyte layer and the air electrode layer share at least two metal elements, preferably three metal elements, the generation of a substance increasing the interface resistance between the two layers is reliably avoided. Along with the improved adhesion, the interface resistance is substantially reduced.

When the electrolyte layer and the air electrode layer respectively contain the materials having the compositions specified by formulas (1) and (2), the region having the composition specified by formula (3) is created through the diffusion of the elements of the materials of the two layers in the heat treatment. In this case, the region exhibits an electron and ion mixed conduction, advantageously working as aggregates. Specifically, in this region, the ionization of oxygen takes place in the two-phase interface (i.e., two-dimensional area), rather than in the three-phase interface (i.e., one-dimensional line) of the electrolyte, the air electrode and the air. The area available for the ionization activity is substantially increased.

When the region of the electron and ion mixed conduction is created through the diffusion, the region is limited to a thin portion of the interface between the electrolyte layer and the air electrode layer, and its thickness is 10 $\mu$m or thinner. To increase the area of the region, the surface of the electrolyte may be made coarse (for example, the surface may be formed through the flame spraying process) or the material of the electrolyte layer may be mixed into the air electrode layer.

Preferably, according to a second method of the present invention, the thickness of the region of the electron and ion mixed conductor available for the ionization of oxygen is flexibly increased. In this method, the air electrode layer and the electrolyte layer are laminated with at least one intermediate layer interposed therebetween, the resulting laminate is sintered to integrate all layers, and the elements are diffused in the interfaces between the adjoining layers through the heat treatment. All layers, including the intermediate layer, have the perovskite type crystal structure. The intermediate layer is preferably selected to have an intermediate composition between the electrolyte layer and the air electrode layer. The intermediate layer preferably includes an electron and ion mixed conductor. In this way, the surface of the intermediate layer is available for the ionization of oxygen.

The multi-layer forming method and lamination method remain unchanged from those employed in the two-layer case in which the intermediate layer is not used. The same heat treatment conditions as those in the two-layer case are also employed. If the electron and ion mixed conductor is used for the intermediate layer in this way, the area of the two-phase interface between the electron and ion mixed conductor, available for the ionization of oxygen, is increased. The thickness of the intermediate layer is preferably within a range from 10 to 100 $\mu$m, more preferably 20–90 $\mu$m, most preferably 30–80 $\mu$m.

Figure 5A:
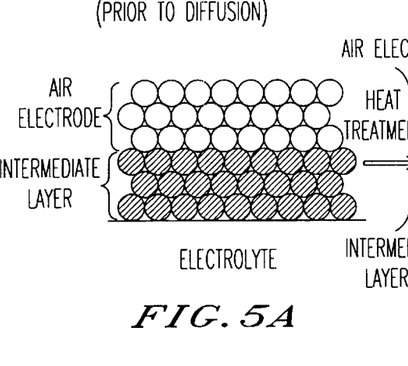
FIGS. 5A and 5B show the interfaces of the electrolyte layer, intermediate layer and air electrode layer, prior to and subsequent to the diffusion.
Figure 5B:
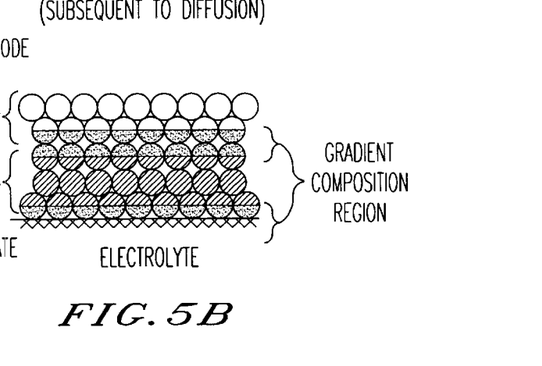

Through the heat treatment, the element diffusion takes place in the interface between the electrolyte layer and the intermediate layer and in the interface between the interface layer and the air electrode layer, and the gradient region with its composition continuously changing therewithin is created in each interface (see FIG. 5B). When the intermediate layer has a composition intermediate between the compositions of the electrolyte layer and the air electrode layer, a variation in the composition in the interface between the electrolyte layer and the intermediate layer and a variation in the composition in the interface between the intermediate layer and the air electrode layer are smaller than a variation in a composition between the electrolyte layer and the air electrode layer resulting from the diffusion in accordance with the first method. A resulting smaller rate of change in composition in the gradient region makes the multi-layered body less susceptible to cracks, deformation, bow, and delamination, thereby resulting in an improved adhesion and bond strength.

For example, the composition of the intermediate layer becomes intermediate between the compositions of the electrolyte layer and the air electrode layer if the following conditions are established: the electrolyte layer has the composition specified by formula (1), the air electrode layer has the composition specified by formula (2), and the intermediate layer has the composition specified by formula (3), wherein A is an identical element shared among formulas (1), (2), and (3), B is an identical element shared among formula (1) and (3), and a$\leq$e$\leq$d or a$\geq$e$\geq$d, and c$\leq$g.

The fuel electrode in the solid oxide fuel cell of this invention preferably includes Ni and ceria (ceric oxide, $CeO_2$) material. Preferably, the fuel electrode is produced by covering a ceria layer, as an aggregate material, with Ni particles or by laminating a Ni layer onto the ceria layer.

Although ceria materials are oxide ion conductors exhibiting a very high conductivity exceeding that of YSZ, an electron conduction appears in a reduction environment by a change $Ce^{+4}\rightarrow Ce^{3+}$, making the ceria materials unusable as a material for the electrolyte layer. Since the ceria materials function as an electron and ion mixed conductor in the reduction environment because of the electron conduction that appears in the reduction environment, the ceria materials are appropriately usable as an aggregate material in the fuel electrode.

Ni—YSZ, which is conventionally the most widely used fuel electrode material, cannot transfer electrons, because YSZ remains an oxide ion conductor even in the reduction environment. The electrode reaction in the fuel electrode side (i.e., the release of electrons in the reaction of the oxide ions with the fuel) takes place in the three-phase interface (namely, in a one-dimensional line) of the electrolyte YSZ, the fuel electrode Ni, and the fuel. YSZ in the fuel electrode merely increases the area of three-phase interface (i.e., the length of the one-dimensional line).

In contrast, when YSZ is replaced with a ceria material exhibiting an electron and ion mixed conduction in a reduction environment, the electrode reaction occurs in a two-dimensional two-phase interface of the ceria and the fuel. In this way, the area available for the electrode reaction is substantially increased in the fuel electrode side. The material of the fuel electrode is different from the material of the electrolyte (i.e., a perovskite type oxide) in crystal structure and member elements. As already discussed in connection with the air electrode, it is not appropriate to perform a heat treatment to create a continuously changing composition (i.e., a gradient region) in the interface between the fuel electrode and the electrolyte. As already disclosed in the conventional art, an intermediate layer having a mixture of the electrolyte material and the fuel electrode material may be formed.

EXAMPLES

Having generally described this invention, a further understanding can be obtained by reference to certain specific examples, which are provided herein for purposes of illustration only and are not intended to be limiting unless otherwise specified.

Example 1

Powder materials, selected from $La_2O_3$, $SrCO_3$, $Ga_2O_3$, MgO and CoO, were well blended at a mixing ratio to result in the compositions specified by formulas (a), (b) and (c). Three types of powder mixture were obtained:

(a) $La_{0.8}Sr_{0.2}Ga_{0.8}Mg_{0.115}Co_{0.085}O_3$
(b) $La_{0.8}Sr_{0.2}CoO_3$
(c) $La_{0.8}Sr_{0.2}Ga_{0.8}Co_{0.2}O_3$

The three types of mixture materials having the compositions specified by formulas (a), (b), and (c) were pre-sintered at a temperature lower than a sintering temperature, and were classified as required to obtain powder materials of a particle size of about 2 $\mu$m.

Slurries were produced from these powders. A green sheet having a thickness of about 100 $\mu$m was formed from the slurry having the composition specified by formula (a) using a doctor blade method, and was then sintered in the air at 1500° C. for 6 hours. After sintering the green sheet, the slurry having the composition specified by formula (c) was applied thereon to a slurry thickness of about 50 $\mu$m using a slurry coating method, and was sintered in the air at 1200° C. for 3 hours. Furthermore, the slurry having the composition specified by formula (b) was applied thereon to a slurry thickness of about 120 $\mu$m using a slurry coating method, and was sintered in the air at 1200° C. for 3 hours. The resulting laminate having, in the order from below, the compositions specified by formulas (a), (b), and (c) was subjected to a heat treatment in the air at 1150° C. for about 100 hours. In this way, there results a three-layer structure including, from below, an oxide ion conductor (i.e., an electrolyte layer)→an electron and ion mixed conductor (i.e., an intermediate layer, an air electrode aggregate material)→an electron conductor (i.e., an air electrode layer).

Figure 6A:
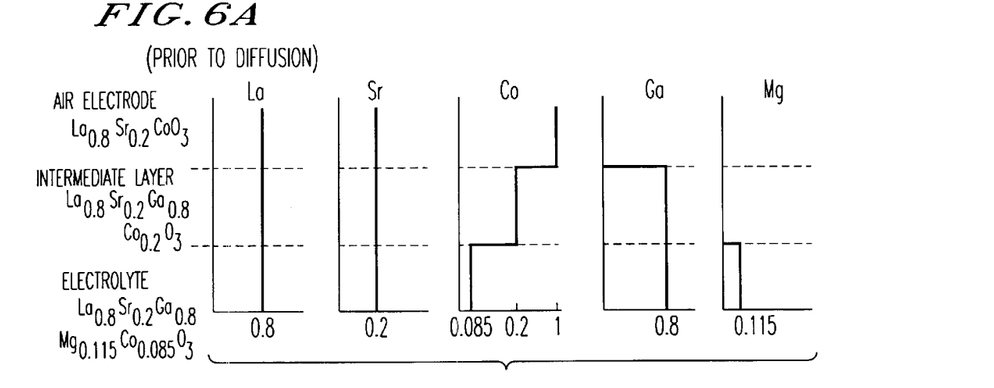
FIGS. 6A and 6B show changes in the distribution of elements (atomic ratio) in the interfaces of the electrolyte layer, intermediate layer and air electrode layer, prior to and subsequent to the diffusion.
Figure 6B:
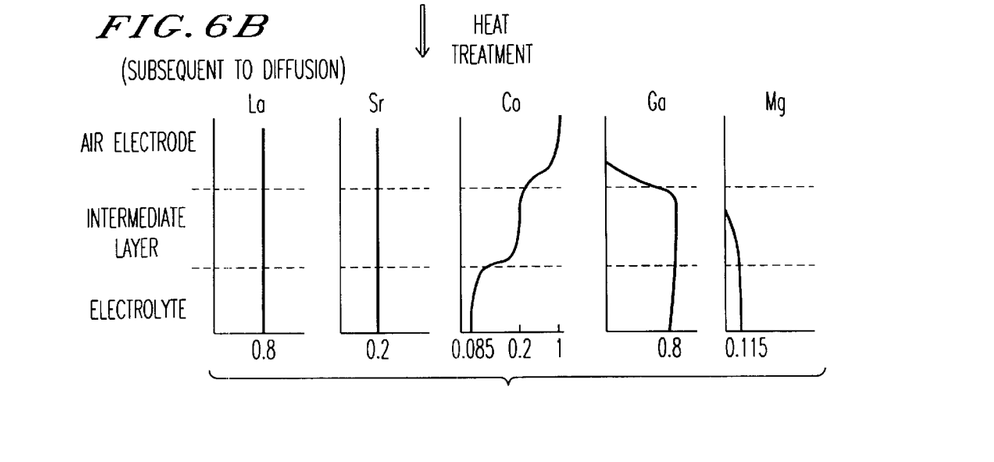

FIGS. 6A and 6B show analysis results of a change in the distribution of each element (i.e., an atomic ratio) in the cross section of the three-layer structure prior to and subsequent to the heat treatment, determined using an electron probe microanalyser. As can be seen from FIGS. 6A and 6B, the concentration of each element continuously changes in the interface between the electrolyte layer and the intermediate layer and in the interface between the intermediate layer and the air electrode layer, and no stepwise discontinuity in the distribution of each element was noticed. It is learned that the heat treatment promotes the diffusion of each element in the interface between adjoining layers, thereby substantially improving the adhesion in the interface. Since there is no stepwise change in the distribution of each element, the interface resistance is substantially reduced. Under thermal stress, the cell is thus less susceptible to a distortion, cracks, and delamination.

Example 2

The procedure described in the example 1 was repeated but without the green sheet having the composition specified by formula (c) serving as the intermediate layer. Specifically, the green sheet of the material having the composition specified by formula (a) and the green sheet of the material having the composition specified by formula (b) were laminated, sintered and subjected to the heat treatment.

Figure 4A:
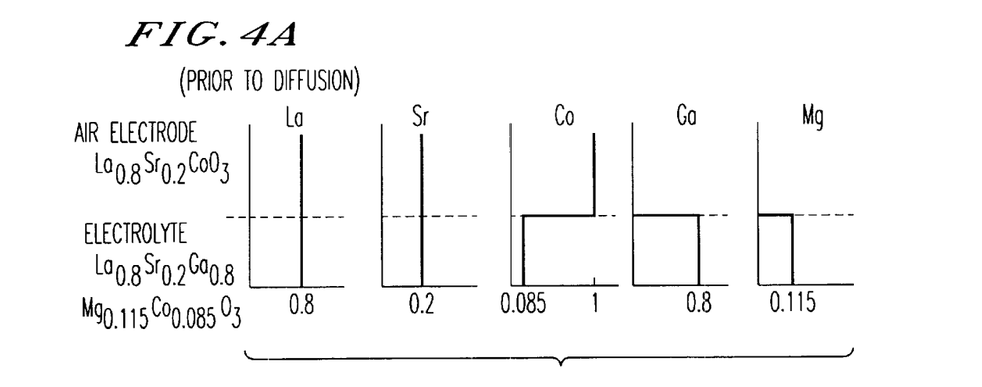
FIGS. 4A and 4B show changes in the distribution of elements (atomic ratio) in the interface between the electrolyte layer and the air electrode layer, prior to and subsequent to the diffusion.
Figure 4B:
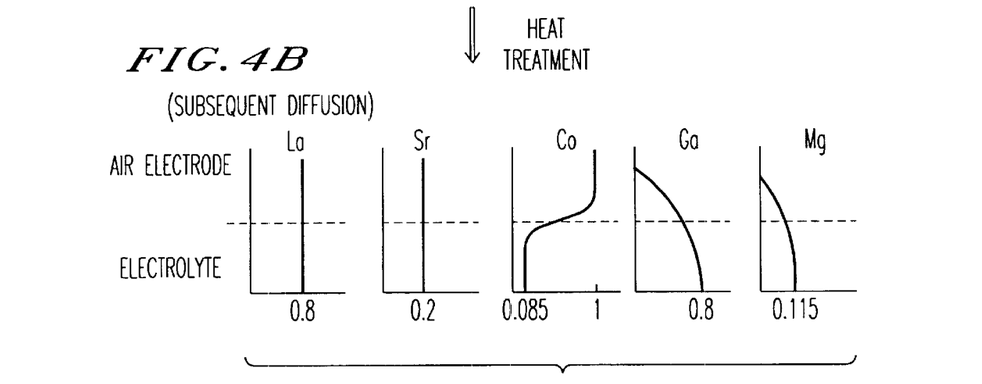

FIGS. 4A and 4B show the distribution of each element in the two-layer structure in its cross section prior to and subsequent to the heat treatment. It is also learned that the concentration of each element continuously changes and that the diffusion of each element takes place during the heat treatment. Although its thickness was thin, a region having the composition corresponding to that of the intermediate layer in the example 1 was generated.

In accordance with the present invention, the materials having an identical perovskite type crystal structure are employed for the electrolyte and the air electrode layer in the solid oxide fuel cell, and the gradient region in which the concentration of each element continuously changes is created between the electrolyte and the air electrode layer taking advantage of the diffusion of the elements in the interface during the heat treatment. As a result, conventional problems, such as a distortion and cracks, due to a difference in thermal expansion coefficient in the interface between the air electrode layer and the electrolyte are substantially alleviated. The adhesion between the layers is improved, the bond strength is increased, the delamination takes place less, and the interface resistance is reduced.

In accordance with the present invention, the electrolyte and the air electrode layer, or the electrolyte, the air electrode aggregate material, and the air electrode layer contain the materials having an identical perovskite type oxide, and contain identical metal elements. Substances increasing the interface resistance are thus prevented from being created in the gradient region during the heat treatment.

Since the conventional gradient region employs a mixture of the electrolyte material and the air electrode material with the mixing ratio continuously changed. Although the composition looks macroscopically continuous, the gradient region, if viewed microscopically, is a mere mixture of two types of particles different in composition and crystal structure, and a discontinuity problem remains unresolved. The manufacturing steps of the conventional gradient region is complex, but the present invention is free from such a problem.

Since the intermediate layer of the electron and ion mixed conductor is interposed between the electrolyte layer of the oxide ion conductor and the air electrode layer of the electron conductor, the entire two-phase interface between the intermediate layer and the air is utilized to ionize oxygen. Compared to the three-phase interface only, the reaction area in the cell is substantially large and the generation of polarization is reduced. A substantially improved cell efficiency thus results. Even if the intermediate layer is omitted, the above advantages are achieved to some degree if a substance having the composition corresponding to that of the intermediate layer is produced in the interface during the heat treatment by selecting proper materials for the electrolyte and the air electrode.

This application is based on Japanese applications 10-292398, filed Oct. 14, 1998, and 11-257611, filed Sep. 10, 1999, the entire contents of each of which are hereby incorporated by reference.

Having now fully described this invention, it will be apparent to one of ordinary skill in the art that many changes and modifications can be made thereto without departing from the spirit or scope of the invention as set forth herein.

What is claimed is:

1. A solid oxide fuel cell having a laminate structure, comprising:

an air electrode layer;

a fuel electrode layer; and a solid electrolyte layer interposed between said air electrode layer and said fuel electrode layer, wherein each of said electrolyte layer and said air electrode layer comprises a perovskite type material, and wherein a composition continuously changes between said electrolyte layer and said air electrode layer, wherein said electrolyte layer comprises a material specified by $La_{1-a}A_aGa_{1-(b+c)}B_bCo_cO_3$, and said air electrode layer comprises a material specified by $La_{1-}$ $_dA_dCoO_3$, and wherein A is at least one element selected from the group consisting of Sr and Ca and mixtures thereof, B is at least one element selected from the group consisting of Mg, Al and In and mixtures thereof, and $0.05 \leq a \leq 0.3$, $0 \leq b \leq 0.3$, $0 \leq c \leq 0.15$, $b+c \leq 0.3$, and $0 \leq d \leq 0.5$.

2. The solid oxide fuel cell according to claim 1, wherein said electrolyte layer and said air electrode layer comprise at least one common identical metal element.

3. The solid oxide fuel cell according to claim 1, wherein $0.1 \leq a \leq 0.25$.

4. The solid oxide fuel cell according to claim 1, wherein $0.17 \leq a \leq 0.22$.

5. The solid oxide fuel cell according to claim 1, wherein $0 \leq b \leq 0.17$.

6. The solid oxide fuel cell according to claim 1, wherein $0.09 \leq b \leq 0.13$.

7. The solid oxide fuel cell according to claim 1, wherein $0.02 \leq c \leq 0.15$.

8. The solid oxide fuel cell according to claim 1, wherein $0.02 \leq c \leq 0.10$.

9. The solid oxide fuel cell according to claim 1, wherein $0.1 \leq b+c \leq 0.25$.

10. The solid oxide fuel cell according to claim 1, wherein $0.15 \leq b+c \leq 0.22$.

11. The solid oxide fuel cell according to claim 1, wherein $0.1 \leq d \leq 0.4$.

12. A method of manufacturing a solid oxide fuel cell, comprising the steps of:

laminating, into a laminate, an air electrode layer of a perovskite type electron conductor material and an electrolyte layer of a perovskite type oxide ion conductor material;

sintering said laminate to integrate said air electrode layer and said electrolyte layer; and heat treating said laminate for diffusing an element constituting said air electrode layer into said electrolyte layer in the interface between said air electrode layer and said electrolyte layer or for diffusing an element constituting said electrolyte layer into said air electrode layer in the interface, or for diffusing said element of said air electrode into said electrolyte layer and said element of said electrolyte into said air electrode layer in the interface, wherein said electrolyte layer comprises a material specified by $La_{1-a}A_aGa_{1-(b+c)}B_bCo_cO_3$, said air electrode layer comprises a material specified by $La_{1-d}A_dCoO_3$, and wherein A is at least one element selected from the group consisting of Sr and Ca and mixtures thereof, B is at least one element selected from the group consisting of Mg, Al and In and mixtures thereof, and $0.05 \leq a \leq 0.3$ $0 \leq b \leq 0.3$ $0 \leq c \leq 0.15$ $b+c \leq 0.3$ and $0 \leq d \leq 0.5$.

13. The method of manufacturing a solid oxide fuel cell according to claim 12, wherein said electrolyte layer and said air electrode layer comprise at least one common identical metal element.

14. The method of manufacturing a solid oxide fuel cell according to claim 12, wherein $0.1 \leq a \leq 0.25$.

15. The method of manufacturing a solid oxide fuel cell according to claim 12, wherein $0.17 \leq a \leq 0.22$.

16. The method of manufacturing a solid oxide fuel cell according to claim 12, wherein $0 \leq b \leq 0.17$.

17. The method of manufacturing a solid oxide fuel cell according to claim 12, wherein $0.09 \leq b \leq 0.13$.

18. The method of manufacturing a solid oxide fuel cell according to claim 12, wherein $0.02 \leq c \leq 0.15$.

19. The method of manufacturing a solid oxide fuel cell according to claim 12, wherein $0.02 \leq c \leq 0.10$.

20. The method of manufacturing a solid oxide fuel cell according to claim 12, wherein $0.1 \leq b+c \leq 0.25$.

21. The method of manufacturing a solid oxide fuel cell according to claim 12, wherein $0.15 \leq b+c \leq 0.22$.

22. The method of manufacturing a solid oxide fuel cell according to claim 12, wherein $0.1 \leq d \leq 0.4$.

* * * * *